(12) United States Patent
Gilmartin et al.

(10) Patent No.: US 10,735,916 B2
(45) Date of Patent: Aug. 4, 2020

(54) TWO-WAY COMMUNICATION INTERFACE FOR VISION-BASED MONITORING SYSTEM

(71) Applicant: Apple Inc., Cupertino, CA (US)

(72) Inventors: Jessica Gilmartin, Menlo Park, CA (US); Jonghoon Jin, Stanford, CA (US); Tomas Alberto Meraz Scherb, Campbell, CA (US); Tiffany Kryze, Mountain View, CA (US); Alexander William Teichman, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/628,236

(22) Filed: Jun. 20, 2017

(65) Prior Publication Data
US 2018/0367962 A1    Dec. 20, 2018

(51) Int. Cl.
| | | |
|---|---|---|
| H04W 4/12 | (2009.01) | |
| G06K 9/00 | (2006.01) | |
| H04N 7/18 | (2006.01) | |
| G07F 17/30 | (2006.01) | |
| H04L 29/06 | (2006.01) | |
| G06F 16/9537 | (2019.01) | |
| G06F 16/783 | (2019.01) | |
| H04L 29/08 | (2006.01) | |

(52) U.S. Cl.
CPC ............ *H04W 4/12* (2013.01); *G06F 16/784* (2019.01); *G06F 16/9537* (2019.01); *G06K 9/00335* (2013.01); *G06K 9/00355* (2013.01); *G06K 9/00362* (2013.01); *G06K 9/00711* (2013.01); *H04L 65/1069* (2013.01); *H04N 7/18* (2013.01); *G06K 2009/00738* (2013.01); *H04L 67/306* (2013.01)

(58) Field of Classification Search
CPC ....... H04W 4/12; G06F 17/3087; H04N 7/18; G06K 9/00362; G06K 9/00335; G06K 9/00711; G06K 2009/00738; H04L 65/1069; H04L 67/306
See application file for complete search history.

(56) References Cited

U.S. PATENT DOCUMENTS

| | | | | |
|---|---|---|---|---|
| 5,881,134 A | * | 3/1999 | Foster ................ | H04M 1/247 379/102.02 |
| 6,693,530 B1 | * | 2/2004 | Dowens ............... | G08B 13/22 340/506 |
| 6,888,927 B1 | * | 5/2005 | Cruickshank ....... | H04M 3/537 379/142.06 |
| 2005/0184867 A1 | * | 8/2005 | Osann, Jr. ........... | G06Q 50/06 340/539.25 |

(Continued)

*Primary Examiner* — Minjung Kim
(74) *Attorney, Agent, or Firm* — Kilpatrick, Townsend & Stockton

(57) ABSTRACT

A method for enabling communicating between users, using a vision-based monitoring system. The method includes monitoring an environment for events, by the vision-based monitoring system and making a determination that a detected event involves a local person, in the monitored environment. The method further includes, based on the determination, identifying at least one remote person to be contacted, identifying a communication channel to the at least one remote person, and providing a notification to the at least one remote person, via the identified communication channel.

18 Claims, 7 Drawing Sheets

(56) References Cited

U.S. PATENT DOCUMENTS

| | | | |
|---|---|---|---|
| 2005/0288063 A1* | 12/2005 | Seo | H04M 1/271 |
| | | | 455/563 |
| 2009/0185723 A1* | 7/2009 | Kurtz | G06K 9/00288 |
| | | | 382/118 |
| 2014/0108019 A1* | 4/2014 | Ehsani | G10L 21/06 |
| | | | 704/275 |
| 2016/0014257 A1* | 1/2016 | He | G06Q 10/10 |
| | | | 455/414.1 |
| 2016/0241660 A1* | 8/2016 | Nhu | H04W 4/80 |
| 2016/0261824 A1* | 9/2016 | Scalisi | H04N 7/142 |
| 2018/0061403 A1* | 3/2018 | Devaraj | G10L 15/22 |

* cited by examiner

TWO-WAY COMMUNICATION INTERFACE FOR VISION-BASED MONITORING SYSTEM

BACKGROUND

Monitoring systems may be used to secure environments and, more generally, to track activity in these environments. People that enter a monitored environment may thus be within the range of a monitoring system. Further, people that remotely access the monitoring system via, e.g., smartphone interfaces, may also be in contact with the monitoring system.

SUMMARY

In general, in one aspect, the invention relates to a method for enabling communicating between users, using a vision-based monitoring system. The method includes monitoring an environment for events, by the vision-based monitoring system and making a determination that a detected event involves a local person, in the monitored environment. The method further includes, based on the determination, identifying at least one remote person to be contacted, identifying a communication channel to the at least one remote person, and providing a notification to the at least one remote person, via the identified communication channel.

In general, in one aspect, the invention relates to a method for enabling communicating between users, using a vision-based monitoring system. The method includes monitoring an environment for events, by the vision-based monitoring system, making a determination that a detected event involves a local person, in the monitored environment. The method further includes recording a message, provided by the local person, storing the recorded message, identifying a remote person to which the stored message is to be sent, and providing the stored message to the remote person.

In general, in one aspect, the invention relates to a method for enabling communicating between users, using a vision-based monitoring system. The method includes monitoring an environment for events, by the vision-based monitoring system, and making a first determination that a detected event involves a local person, in the monitored environment. The method further includes, based on the determination, identifying the local person, by querying profiles of persons specific to the site where the local person was detected, in a monitoring system database, and playing back a previously recorded message to the local user.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a monitoring system used for monitoring and/or securing an environment. More specifically, one or more embodiments of the invention enable communication between a person in the monitored environment and another person. The communication may be the exchange of a message or messages, or a real-time one-way or two-way communication using a live communication link. A detailed description is provided below.

Figure 1:
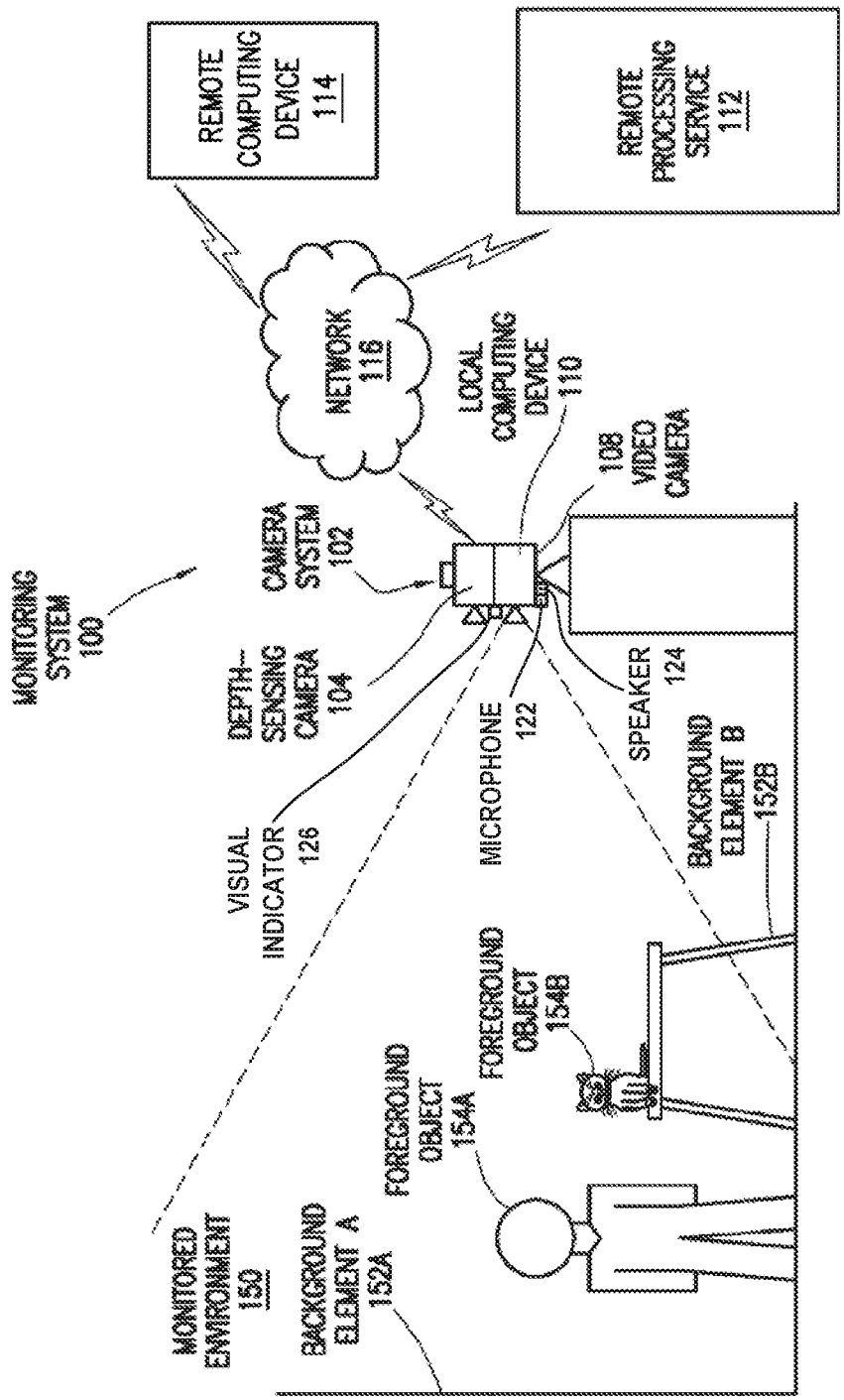
FIG. 1 shows an exemplary monitoring system, in accordance with one or more embodiments of the invention.

FIG. 1 shows an exemplary monitoring system (100) used for the surveillance of an environment (monitored environment (150)), in accordance with one or more embodiments of the invention. The monitored environment may be a three-dimensional space that is within the field of view of a camera system (102). The monitored environment (150) may be, for example, an indoor environment, such as a living room or an office, or it may be an outdoor environment such as a backyard. The monitored environment (150) may include background elements (e.g., 152A, 152B) and foreground objects (e.g., 154A, 154B). Background elements may be actual backgrounds, e.g., a wall or walls of a room, and/or other objects, such a furniture.

In one embodiment of the invention, the monitoring system (100) may classify certain objects, e.g., stationary objects such as a table (background element B (152B)) as background elements. Further, in one embodiment of the invention, the monitoring system (100) may classify other objects, e.g., moving objects such as a human or a pet, as foreground objects (154A, 154B). The monitoring system (100) may further classify detected foreground objects (154A, 154B) as threats, for example, if the monitoring system (100) determines that a person (154A) detected in the monitored environment (150) is an intruder, or as harmless, for example, if the monitoring system (100) determines that the person (154A) detected in the monitored environment (150) is the owner of the monitored premises, or if the classified object is a pet (154B). Embodiments of the invention may be based on classification schemes ranging from a mere distinction between moving and non-moving objects to the distinction of many classes of objects including, for example, the recognition of particular people and/or the distinction of different pets, without departing from the invention.

In one embodiment of the invention, the monitoring system (100) includes a camera system (102) and a remote processing service (112). In one embodiment of the invention, the monitoring system further includes one or more remote computing devices (114). Each of these components is described below.

The camera system (102) may include a video camera (108) and a local computing device (110), and may further include a depth sensing camera (104). The camera system (102) may be a portable unit that may be positioned such that the field of view of the video camera (108) covers an area of interest in the environment to be monitored. The camera system (102) may be placed, for example, on a shelf in a corner of a room to be monitored, thereby enabling the camera to monitor the space between the camera system (102) and a back wall of the room. Other locations of the camera system may be used without departing from the invention.

The video camera (108) of the camera system (102) may be capable of continuously capturing a two-dimensional video of the environment (150). The video camera may use, for example, an RGB or CMYG color or grayscale CCD or CMOS sensor with a spatial resolution of for example, 320×240 pixels, and a temporal resolution of 30 frames per second (fps). Those skilled in the art will appreciate that the invention is not limited to the aforementioned image sensor technologies, temporal, and/or spatial resolutions. Further, a video camera's frame rates may vary, for example, depending on the lighting situation in the monitored environment.

In one embodiment of the invention, the camera system (102) further includes a depth-sensing camera (104) that may be capable of reporting multiple depth values from the monitored environment (150). For example, the depth-sensing camera (104) may provide depth measurements for a set of 320×240 pixels (Quarter Video Graphics Array (QVGA) resolution) at a temporal resolution of 30 frames per second (fps). The depth-sensing camera (104) may be based on scanner-based or scannerless depth measurement techniques such as, for example, LIDAR, using time-of-flight measurements to determine a distance to an object in the field of view of the depth-sensing camera (104). The field of view and the orientation of the depth sensing camera may be selected to cover a portion of the monitored environment (150) similar (or substantially similar) to the portion of the monitored environment captured by the video camera. In one embodiment of the invention, the depth-sensing camera (104) may further provide a two-dimensional (2D) grayscale image, in addition to the depth-measurements, thereby providing a complete three-dimensional (3D) grayscale description of the monitored environment (150). Those skilled in the art will appreciate that the invention is not limited to the aforementioned depth-sensing technology, temporal, and/or spatial resolutions. For example, stereo cameras may be used rather than time-of-flight-based cameras.

In one embodiment of the invention, the camera system (102) further includes components that enable communication between a person in the monitored environment and the monitoring system The camera system may thus include a microphone (122), a speaker (124), and/or a visual indicator (126). While the microphone (122) and the speaker (124) may be used to support acoustic communication, e.g. verbal communication, the visual indicator (126), along with the video camera (108) and/or the depth-sensing camera (104) may be used for visual communication, as further described below. The visual indicator (126) may be an indicator light such as a single-color or multi-color light emitting diode(s) (LEDs) that may light up or flash periodically, for example, to indicate a status of the monitoring system, to notify the person near the camera system (102) that a message is available, etc. Alternatively or additionally, a small screen, e.g., a liquid crystal display or an LED display may be integrated in the camera system (102) to display text, images or graphics.

In one embodiment of the invention, the camera system (102) includes a local computing device (110). Any combination of mobile, desktop, server, embedded, or other types of hardware may be used to implement the local computing device. For example, the local computing device (110) may be a system on a chip (SOC), i.e., an integrated circuit (IC) that integrates all components of the local computing device (110) into a single chip. The SOC may include one or more processor cores, associated memory (e.g., random access memory (RAM), cache memory, flash memory, etc.), a network interface (e.g., a local area network (LAN), a wide area network (WAN) such as the Internet, mobile network, or any other type of network) via a network interface connection (not shown), and interfaces to storage devices, input and output devices, etc. The local computing device (110) may further include one or more storage device(s) (e.g., a hard disk, an optical drive such as a compact disk (CD) drive or digital versatile disk (DVD) drive, a flash memory stick, etc.), and numerous other elements and functionalities. In one embodiment of the invention, the computing device includes an operating system (e.g., Linux) that may include functionality to execute the methods further described below. Those skilled in the art will appreciate that the invention is not limited to the aforementioned configuration of the local computing device (110). In one embodiment of the invention, the local computing device (110) may be integrated with the video camera (108) and/or the depth sensing camera (104). Alternatively, the local computing device (110) may be detached from the video camera (108) and/or the depth sensing camera (104), and may be using wired and/or wireless connections to interface with the local computing device (110). In one embodiment of the invention, the local computing device (110) executes methods that include functionality to implement at least portions of the various methods described below (see e.g., FIGS. 3-4C). The methods performed by the local computing device (110) may include, but are not limited to, functionality to process and stream video data provided by the camera system (102) to the remote processing service (112), and functionality to provide communication links between parties using the monitoring system via, for example, a remote computing device and the camera system (102).

Continuing with the discussion of FIG. 1, in one or more embodiments of the invention, the monitoring system (100) includes a remote processing service (112). In one embodiment of the invention, the remote processing service (112) is any combination of hardware and software that includes functionality to serve one or more camera systems (102). More specifically, the remote processing service (112) may include one or more servers (each including at least a processor, memory, persistent storage, and a communication interface) executing one or more applications (not shown) that include functionality to implement various methods described below with reference to FIGS. 3-4C. The services provided by the remote processing service (112) may include, but are not limited to, functionality for: receiving and archiving streamed video from the camera system (102), monitoring one or more objects in the environment using the streamed video data, determining whether events have occurred that warrant certain actions, such as sending notifications to users, establishing communication links between parties that use the monitoring system, etc.

In one or more embodiment of the invention, the monitoring system (100) includes one or more remote computing devices (114). A remote computing device (114) may be a device (e.g., a personal computer, laptop, smart phone, tablet, etc.) capable of receiving notifications from the remote processing service (112) and/or from the camera system (102). A notification may be, for example, a text message, a phone call, a push notification, etc. In one embodiment of the invention, the remote computing device (114) may include functionality to enable a local user of the monitoring system (100), in the monitored environment (150), to interact with a remote person accessing the monitoring system (100) via the remote computing device (114). The interaction may be a one-way interaction or a two-way communication interaction, as further described below with reference to FIGS. 3-4C.

The components of the monitoring system (100), i.e., the camera system(s) (102), the remote processing service (112) and the remote computing device(s) (114) may communicate using any combination of wired and/or wireless communication protocols. In one embodiment of the invention, the camera system(s) (102), the remote processing service (112), and the remote computing device(s) (114) communicate via a wide area network (116) (e.g., over the Internet), and/or a local area network (116) (e.g., an enterprise or home network). The communication between the components of the monitoring system (100) may include any combination of secured (e.g., encrypted) and non-secure (e.g., un-encrypted) communication. The manner in which the components of the monitoring system (100) communicate may vary based on the implementation of the invention.

Additional details regarding the monitoring system and the detection of events that is based on the distinction of foreground objects from the background of the monitored environment are provided in U.S. patent application Ser. No. 14/813,907 filed Jul. 30, 2015, the entire disclosure of which is hereby expressly incorporated by reference herein.

One skilled in the art will recognize that the monitoring system is not limited to the components shown in FIG. 1. For example, a monitoring system, in accordance with an embodiment of the invention, may not be equipped with a depth-sensing camera. Further, a monitoring system, in accordance with an embodiment of the invention may not necessarily require a local computing device and a remote processing service. For example, the camera system may directly stream to a remote processing service, without requiring a local computing device or requiring only a very basic local computing device. In addition, the camera system may include additional components not shown in FIG. 1, e.g. infrared illuminators providing night vision capability, ambient light sensors that may be used by the camera system to detect and accommodate changing lighting situations, etc. Further, a monitoring system may include any number of camera systems, any number of remote processing services, and/or any number of remote computing devices. In addition, the monitoring system may be used to monitor a variety environments, including various indoor and outdoor scenarios.

Figure 2:
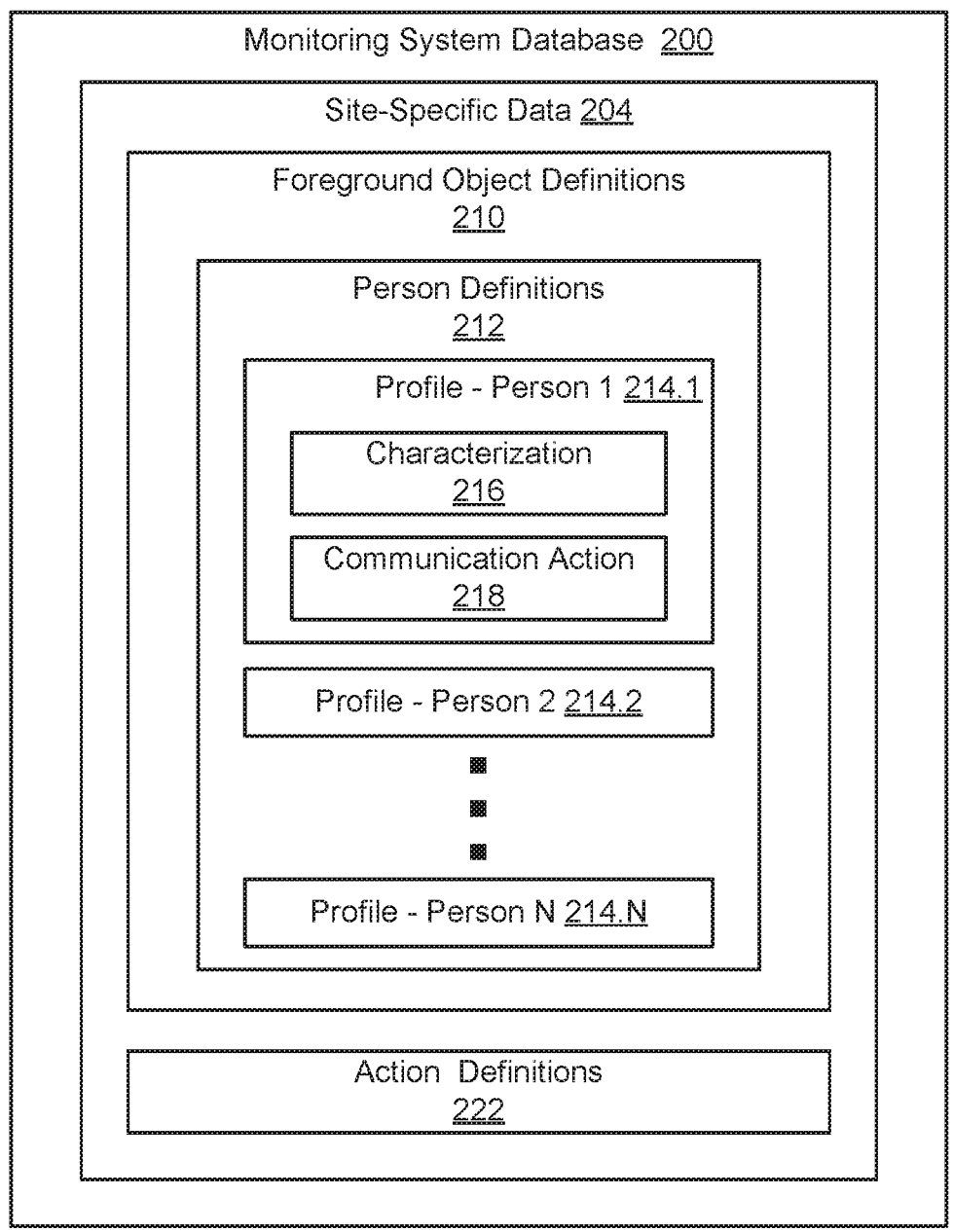
FIG. 2 shows an organization of a monitoring system database, in accordance with one or more embodiments of the invention.

Turning to FIG. 2, FIG. 2 shows an organization of the monitoring system database, in accordance with one or more embodiments of the invention. The monitoring system database may store data received from many monitoring systems. Consider, for example, a monitoring system database that is operate by an alarm monitoring company. Such a monitoring system database may store data for thousands of monitoring systems, installed to protect the premises of customers of the alarm monitoring company. Accordingly, the monitoring system database is organized by sites and data is grouped per site as site-specific data (204). While FIG. 2 only shows site-specific data for one site, those skilled in the art will appreciated that a monitoring system database typically accommodates data for many sites. The site-specific data (204) includes foreground object definitions (210) and action definitions (222). The foreground object definitions (210) may include definitions of foreground objects that are persons (person definitions (212)). The foreground object definitions (210) may enable the monitoring system to determine who or what the detected foreground object is, when a foreground object is present in the monitored environment, as further described below.

In one embodiment of the invention, person definitions (212) include characterizations of foreground objects that are persons. The person definitions (212) may include data for all persons specific to a site, and that are known to the monitoring system. A separate profile (214) may exist for each person known to the monitoring system. In one embodiment of the invention, a profile (214) for a person includes a characterization (216) of the person. The characterization may include content that makes the person uniquely identifiable by the monitoring system. Various characteristics of the person may be relied upon for the identification, and accordingly, the corresponding person definitions may include various elements.

For example, the characterization (216) may include an image of the person. This image may serve as a reference, e.g., in a template matching approach, enabling the monitoring system to detect the person, when in the monitored environment. The image may have been obtained by the camera system of the monitoring system when the person was present in the monitored environment. Alternatively, the image may have been uploaded, e.g., by a user or administrator of the monitoring system. Such an uploaded image may be useful to recognize new people, i.e., people that the monitoring system has not yet seen, e.g. guests. An uploaded image may be, for example, a profile picture obtained from a social media profile, or any other image of the person. The characterization may further include a 3D model of the person. The 3D model may include basic characteristics such as the person's size or a 3D outline, but it may also be a more sophisticated volume model of the person.

Those skilled in the art will recognize that any feature associated with a person may be stored in the characterization (216) of a person. These features may include audio recordings to enable voice recognition, radio frequency identification (RFID) signatures if the person is known to carry an RFID tag, a network IDs such as a device address of the person's cell phone, etc. Other features associated with the person may be the person's name, the person's relationship to other persons that have profiles in the monitoring system database (e.g., one individual may be listed as the spouse of another individual, both of which have profiles in the monitoring system database), and that are associated with the same site, etc.

A profile for a person (214) may further include a communication action (218). In one embodiment of the invention, a communication action (218) is a preconfigured action that may be executed when a person is detected in the monitored environment, by the monitoring system. Such an action may include, but is not limited to, playing back a previously recorded message to the person, notifying another person of the presence of the person in the monitored environment, establishing a communication channel between the person in the monitored environment and a remote person, etc. Multiple communication actions (218)

may be specified in the profile (214). Examples for communication actions (218) are provided below, in a series of use cases.

A communication action (218) may be specific to a particular person, or it may apply to an entire group or persons. For example, a notification may be sent to a remote party, whenever a family member (regardless of who the family member is), is detected when entering through the front door in the monitored environment. Further, there may be default communication actions for persons that are not recognized and/or for persons to whom no specific communication action was assigned. In one embodiment of the invention, a library of communication actions is set up, enabling a user of the monitoring system to assign communication actions to persons, as desired.

In one embodiment of the invention, the foreground object data includes action definitions (222). Action definitions may establish actions that, when performed by a person, trigger an action by the monitoring system, as described below in FIGS. 3-4C. Action definitions may include gestures (e.g., waving toward the camera or a particular hand configuration), facial expressions (e.g., a smile or a grimace), speech commands, and any other action that is detectable and identifiable by the monitoring system. The action definitions may be stored in any form that enables a verification of an observed action, performed by a person in the monitored environment, against the action definitions, to determine whether a particular action was actually performed. For example, a stationary gesture may be stored as reference image of the gesture. A movement, e.g., waving, may be stored as an object track, e.g., in a series of consecutive images that include a moving limb performing the gesture. Alternatively, more abstract representations, such as vectors, may be chosen to encode the gesture.

The monitoring system database (200) may be any type of database that enables the storage of foreground object data as described above. The monitoring system database (200) may be hosted on any type of non-volatile (or persistent) storage, including, for example, a hard disk drive, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM). Further, the monitoring system database (200) may be implemented using a redundant array of independent disks (RAID), network attached storage (NAS), cloud storage, etc. At least some of the content of the video archive may alternatively or, additionally, be stored in volatile memory, e.g., Dynamic Random-Access Memory (DRAM), Synchronous DRAM, SDR SDRAM, and DDR SDRAM. The storage used for the monitoring system database (200) may be a component of the remote processing service (112), or it may be located elsewhere, e.g., in a dedicated storage array or in a cloud storage service.

Those skilled in the art will appreciate that the monitoring system database (200) is not limited to the elements shown in FIG. 2. Specifically, the monitoring system database may further include additional content, including definitions of non-human foreground objects (e.g., pets), background objects, a configuration of the monitoring system, user accounts, etc., without departing from the invention. Further, the monitoring system database (200) may grow as the monitoring system is operating. New person definitions (212) may be added to the foreground object data (210) when the monitoring system detects new persons in the monitoring environment, or when a user of the monitoring system adds a definition of a new person.

Figure 3:
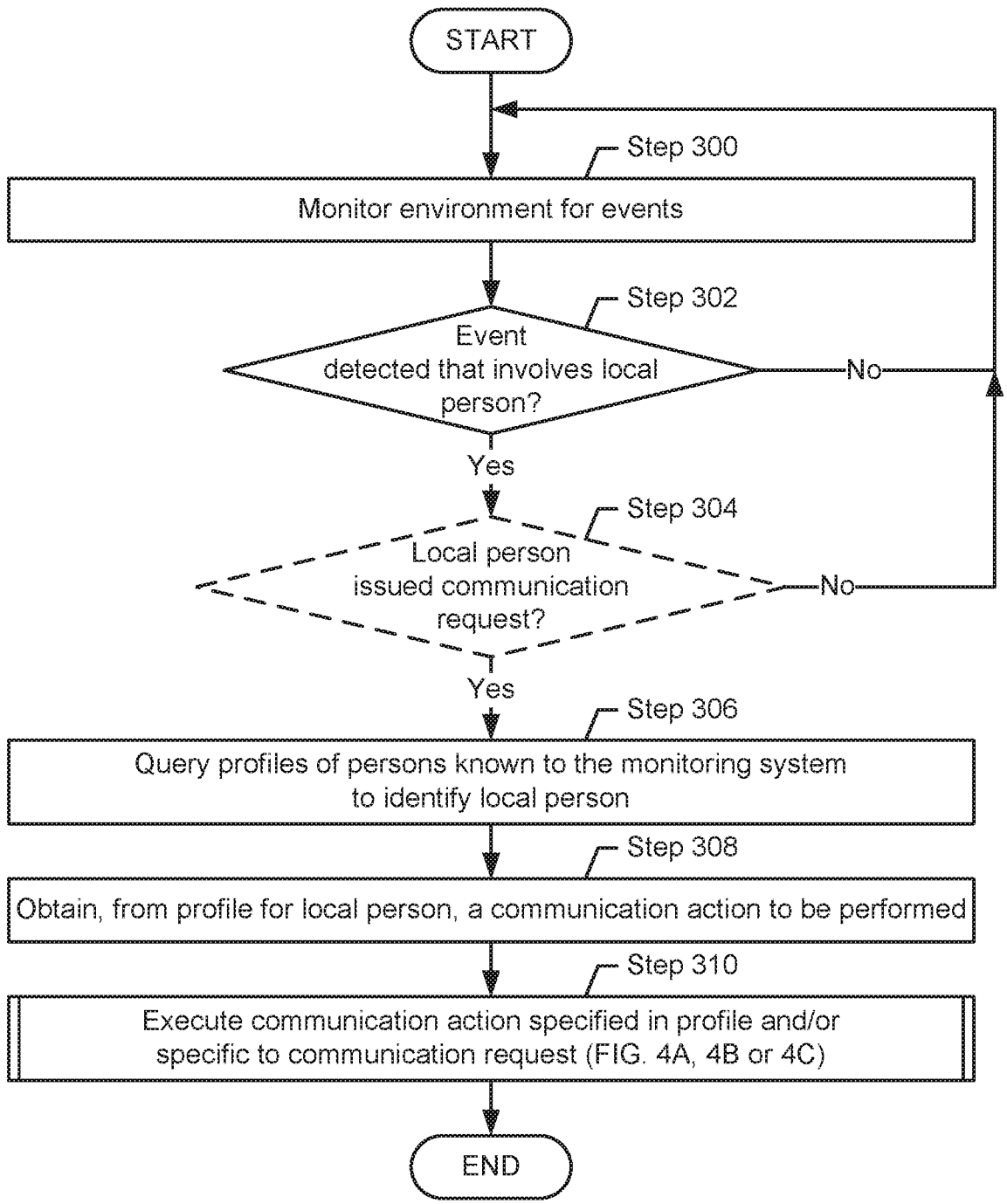
FIGS. 3-4C show flowcharts describing methods for two-way communication via a monitoring system, in accordance with one or more embodiments of the invention.
Figure 4A:
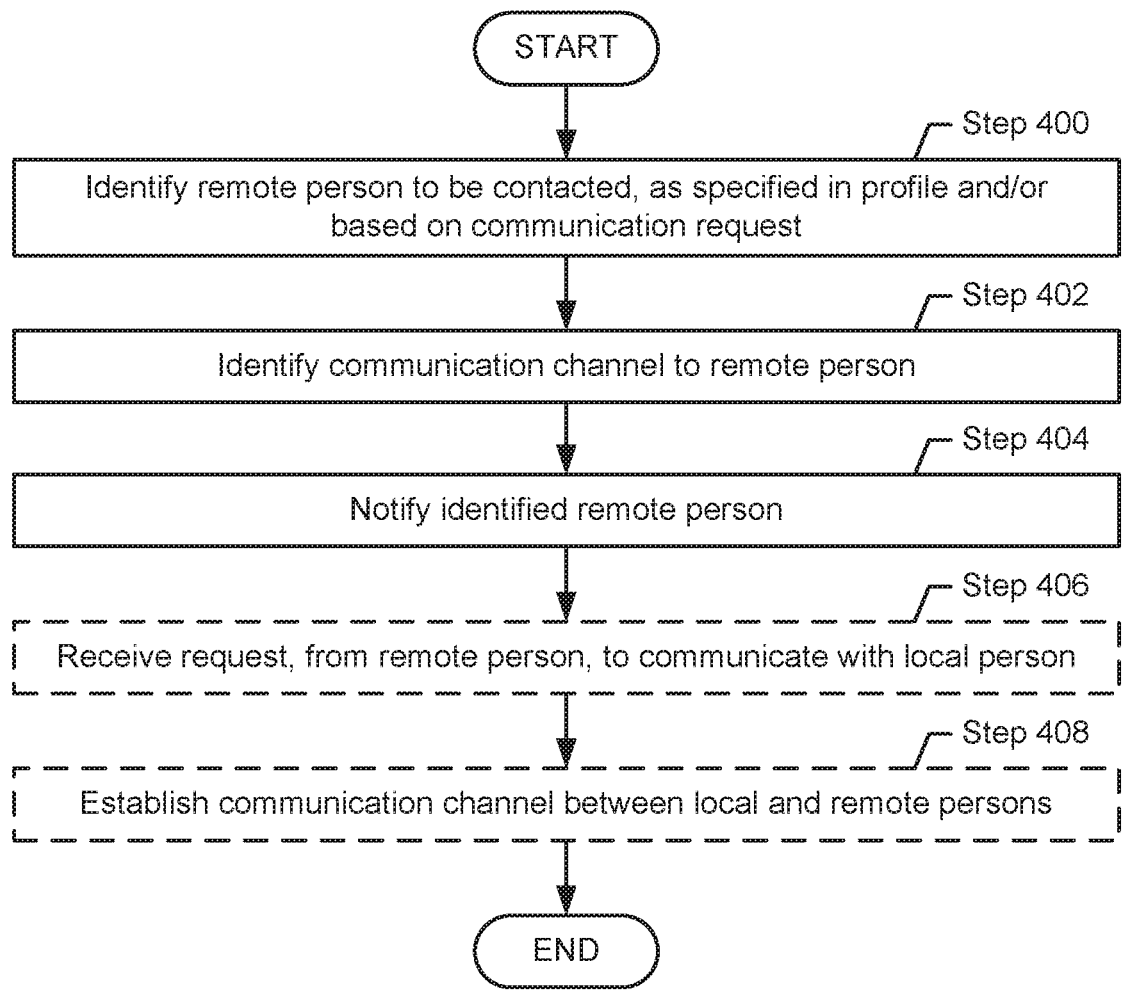
Figure 4B:
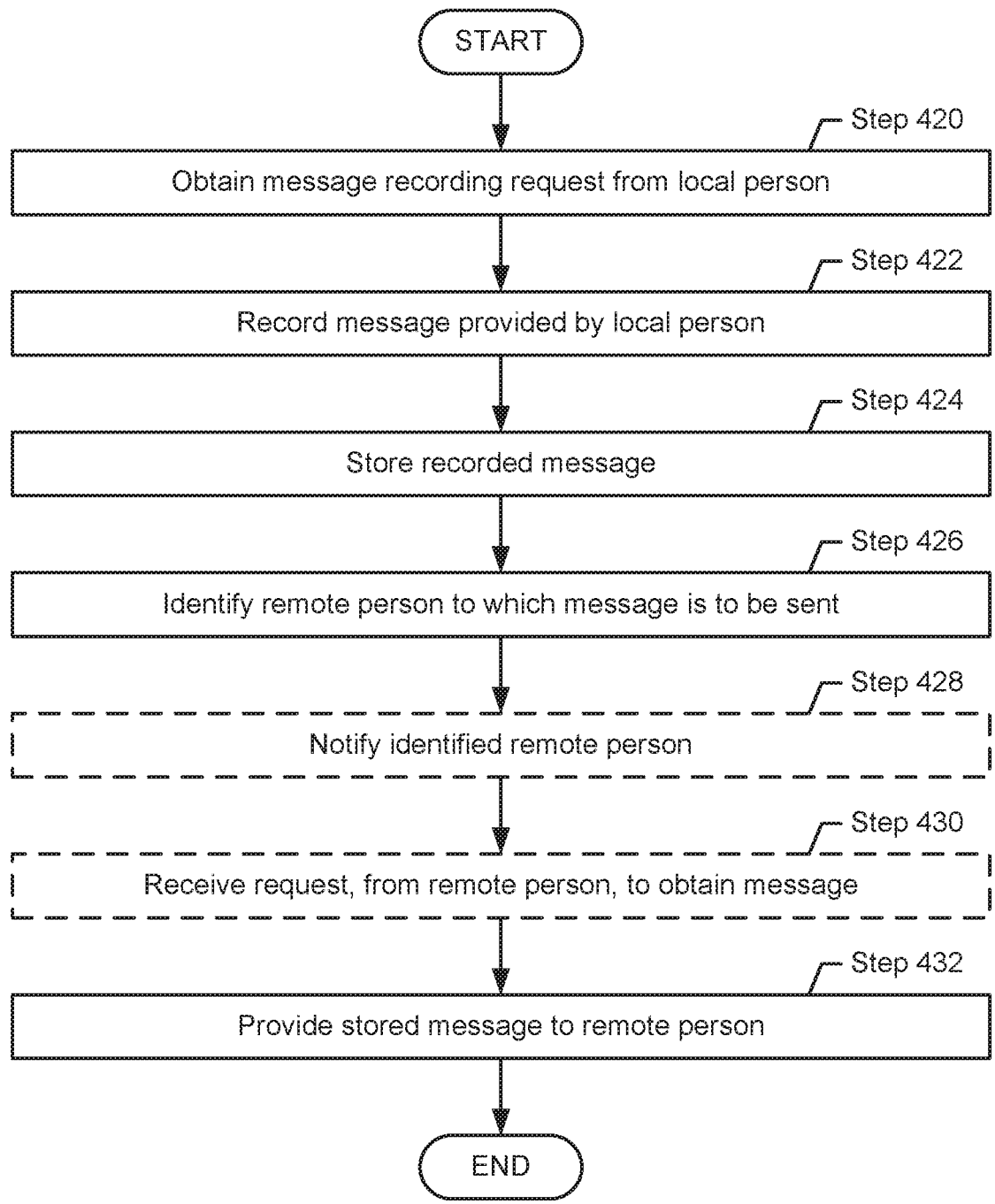
Figure 4C:
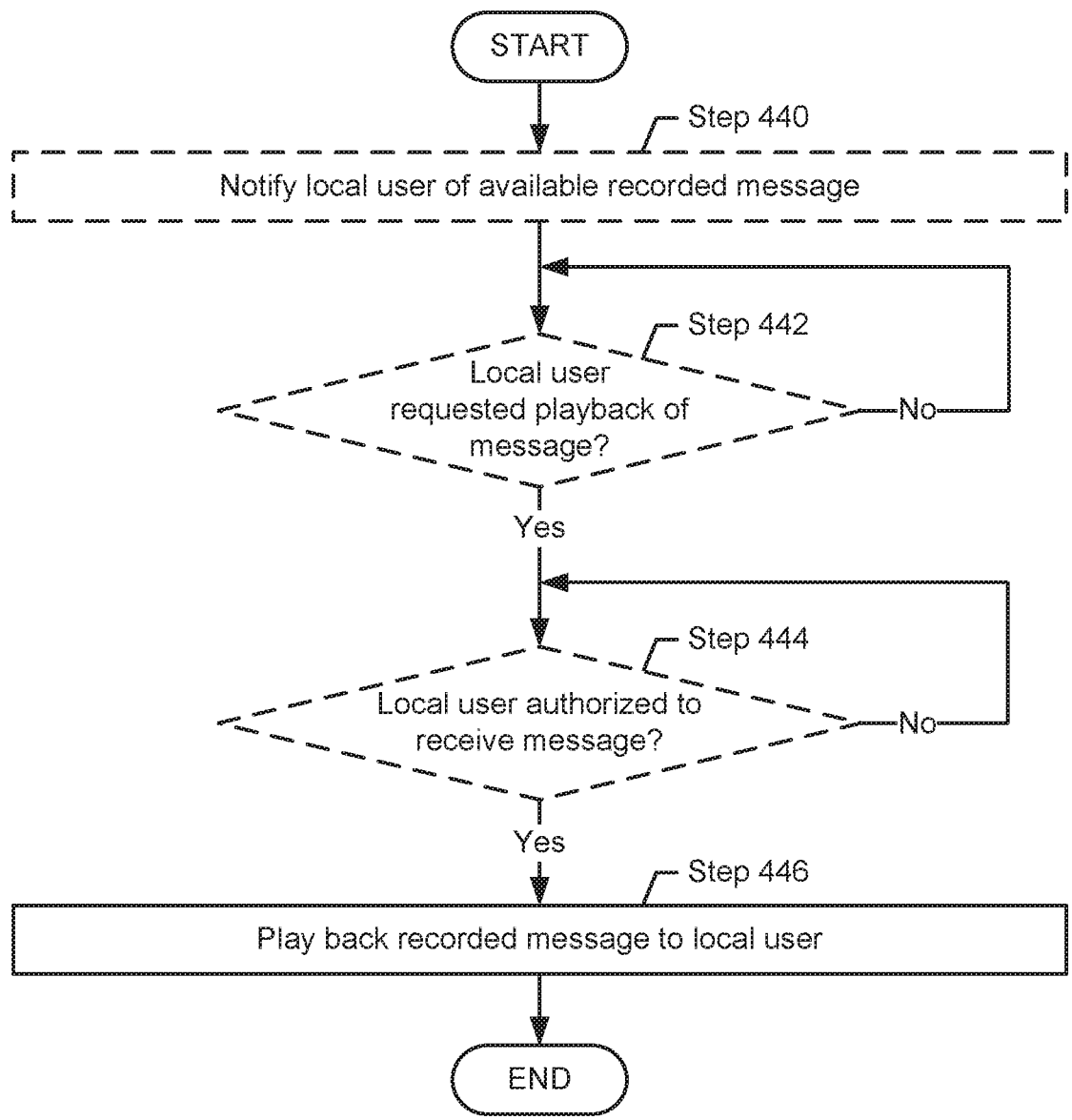

FIGS. 3-4C show flowcharts in accordance with one or more embodiments of the invention. While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 3-4C may be performed in parallel with any other steps shown in FIGS. 3-4C without departing from the invention.

FIG. 3 shows a method for user interaction, provided by the monitoring system, in accordance with one or more embodiments of the invention. In one scenario, the user interaction may be between two local persons, e.g., two users that are in the monitored environment at different times, using the monitoring system for exchanging messages. In another scenario, the user interaction may be between two local persons that are accessing the monitoring system via two different camera systems of the monitoring system, e.g., camera systems that are set up in different rooms. In this scenario, the monitoring system may be used for exchanging messages or for a two-way communication. In yet another scenario, the user interaction may be between a local person and a remote person that connects to the monitoring system using a remote computing device such as a smartphone. In this scenario, the monitoring system may be used for exchanging messages or for a two-way communication. These scenarios are described below within the framework of the flowchart of FIG. 3. In addition, uses cases for the above scenarios are provided below, to illustrate the use of the monitoring system for the purpose of providing a communication link between users of the monitoring system.

One or more of the steps described in FIG. 3 may be performed by a local computing device, e.g., a computing device that is part of a camera system, a remote processing service, a remote computing device and/or any combination of those components.

Turning to FIG. 3, in Step 300, the environment, secured by the monitoring system, is monitored for events. In one embodiment of the invention, an event is the motion of an object, detected in the monitored environment. Motion may be detected by a camera system of the monitoring system. In one embodiment of the invention, a moving object, detected by the monitoring system, is considered a foreground object, whereas stationary elements may be considered background. Further, in one or more embodiments of the invention, an object classification is performed. The object classification may distinguish people from other foreground objects, e.g., pets, and depending on the level of granularity, different people may be distinguished based on facial recognition, size, or any other visual cue that the camera system is capable of capturing. If the camera system of the monitoring system only includes a video camera, the detection and classification may be based on two-dimensional (2D) cues such as 2D size, color, texture, etc. If the camera system of the monitoring system includes a depth sensing camera, three-dimensional (3D) cues may be relied upon, in addition or alternatively. The object classification may also consider the track of a foreground object, i.e., the foreground object appearing in a set of subsequent video frames, thus enabling the detection of actions, such as gestures. In one embodiment of the invention, the monitoring system relies on the characterizations of persons, stored in the monitoring system database in order to classify or identify a person.

Additional details regarding the monitoring system and the detection of events that is based on the distinction of foreground objects from the background of the monitored environment are provided in U.S. patent application Ser. No. 14/813,907 filed Jul. 30, 2015, the entire disclosure of which is hereby expressly incorporated by reference herein.

In Step 302, a determination is made about whether an event that involves a person, locally present in the monitored environment, is detected. The determination, in accordance with an embodiment of the invention, involves the detection of movement (thus signaling the presence of an event) and an event classification (to determine that the event involves a person), as described in Step 300. If a determination is made that no event was detected or that a detected event does not involve a person (e.g., if an event is triggered by a pet), the method may return to Step 300. If an event is detected that involves a person, the method may proceed to Step 304.

In Step 304, a determination is made about whether the local person issued a communication request. A communication request may be any user activity that was previously defined as a signal indicating a user's intention to communicate. A communication request may be, for example, a gesture, such as waiving in the direction of the camera system (or any other gesture), a facial expression or a voice command Visual communication requests such as waiving toward the camera may be detected using the methods used for detection of events, as previously discussed. Specifically, in one embodiment of the invention, when a user performs an action (as defined above), the action may be classified or identified based on the action definitions specific to the site where the action occurred. Next, it is determined whether the detected action is an action that signifies an intent to communicate. In the above example, the action "waving" signifies that the person performing the action wants to communicate. The detection may thus involve the analysis of foreground object tracks in order to determine whether the user performed the gesture that stands for a communication request. A communication request may alternatively be an audio request, such as a spoken request. Consider a scenario in which the monitoring system is configured to notify a mother when her son, Tom, returns home from school. The camera system of the monitoring system faces the front door, and once Tom enters the front door after returning from school, he is detected as a moving object. Tom then waves at the camera (visual communication request) to indicate to his mother that he has safely arrived at home. Alternatively or additionally Tom may say "Mom, I'm home" (audio communication request).

If a determination is made that no communication request was issued, the method may return to Step 300. If a communication request was detected, the method may proceed to Step 306.

Step 304 is optional, i.e., in one or more embodiments of the invention, the method may directly proceed from Step 302 to Step 306, without prior execution of Step 304.

In Step 306, the local person is identified. Any means for identification may be used, without departing from the invention. In one embodiment of the invention, the person definitions, stored in the monitoring system database are relied on, for the identification of the local person. The person definitions may be searched until a profile of a person that includes a characterization with elements that match the data captured by the camera system, including video and audio data, is found. Only the person definitions that are specific to the site where the person was seen may be searched. The identified profile may subsequently be used. If no match is found, or if the execution of Step 306 is skipped, the local person may be assumed to be an unidentified person. In such a scenario, a default profile may be relied upon.

In Step 308, a communication action to be performed is retrieved from the profile obtained in Step 306. If multiple communication actions are specified in the profile established for the local person, one or more communication actions may be selected for subsequent execution. The selection may be performed, for example, based on the communication request issued in Step 304. Consider the above-described scenario of Tom returning home from school, and further assume that Tom says "I want to talk to mom!" In this scenario, the communication action for a two-way communication (enabling Tom to talk to his mother) is selected, even though Tom's profile may also include communication actions to be used for messaging or other types of offline communication.

In Step 310, the communication action is executed. The communication action may be customized, based on the communication request provided by the user in Step 304. For example, the communication action may include contacting a specific person, providing a particular message, etc. Many different types of communication actions may be performed in Step 310. Details regarding the execution of these communication requests are provided in FIGS. 4A, 4B and 4C. FIG. 4A addresses scenarios in which a notification is provided to a remote person, and in which subsequently a two-way communication channel may be established between the local person and the remote person. FIG. 4B addresses scenarios in which a local person records a message for a remote person. FIG. 4C addresses scenarios in which the local person obtains a previously recorded message. The scenarios described in FIGS. 4A-4C may accommodate many different communication scenarios. These scenarios are illustrated by a set of use cases, discussed below. These scenarios are not intended to limit the invention.

FIG. 4A shows a method for notifying a remote person and optionally for establishing a one-way or two-way communication channel between the local person and a remote person, in accordance with one or more embodiments of the invention.

In Step 400, the remote person to be contacted is identified. The remote person to be contacted may be named in the communication action that is being executed. For example, a specific person or a group of persons to be contacted may be named in the communication action, or all people that are associated with the site, e.g., persons that have a profile, may be selected. Alternatively, the person to be contacted may be obtained from the communication request issued in Step 304. In the previously used example of Tom wanting to talk to his mother (communication request: "I want to talk to mom!"), the person to be contacted is Tom's mother. In this scenario, information in the person profiles, stored in the monitoring system database as site-specific data, may be relied upon to identify the relationship between Tom and his mother, and to, then, resolve Tom's request by determining that his mother is the person to be contacted.

In Step 402, a communication channel to the remote person is identified. A remote person to be notified may, for example, be reachable via a portable computing device, e.g., the remote person's smartphone. However, the remote person may also be directly reachable if, in a monitoring system that includes multiple camera systems, the remote person is seen by another camera system. Accordingly, the monitoring system may determine whether the remote person is currently detected (as another local person) by the monitoring system. In addition or alternatively, the monitoring system may access the remote person's profile to identify a remote computing device that may be used to reach the remote person.

In Step 404, the remote person is notified. If the remote person is contacted via the remote person's smartphone, the notification may be any kind of push notification, signal or message such as a ringtone, a notification sound, an indicator light, a text message, a voice message, etc. If a message is provided, the message may include details regarding the events that triggered the notification. For example, a message provided by the local person may be played back, an image of the monitored environment, showing the local person may be provided and/or descriptive information of the observed event, including date and time of the event, the person and/or recognized gesture performed by the person, etc., may be provided. If the remote person is contacted via a camera system located elsewhere, the notification may be delivered, for example, as a voice message by the speaker of the camera system. Additionally or alternatively a visual notification, e.g., in the form of a flashing light, may be provided via the remote camera system's visual indicator.

In Step 406, the monitoring system receives a request, from the remote person, to communicate with the local person. The remote person may provide the request as a spoken request, or by selecting a communication option, e.g., on the remote person's smartphone, to open a communication channel to the local person.

The execution of Step 406 is optional. For example, the remote person may choose not to respond to the notification, and as a result neither Step 406 nor Step 408 may be executed.

In Step 408, the communication channel between the local and the remote persons is established. The communication may be, for example, a one-way or a two-way audio connection. Further, the communication may also include a live video, captured by the camera system, provided to the remote person. In one embodiment of the invention, the remote communication may be performed via the remote processing service of the monitoring system. Alternatively, a peer-to-peer connection may be established between the camera system of the local person and the device of the remote person (i.e., either a remote computing device or another camera system). The peer-to-peer connection bypasses the remote processing service thus reducing potential latencies in the communication channel.

FIG. 4B shows a method for providing a message, recorded by a local person, to a remote person.

In Step 420, a message recording request is obtained from the local person. Similar to the previously described communication request, the message recording request may be, for example, a gesture, such as waiving in the direction of the camera system, a facial expression or a voice command In one embodiment of the invention, the communication request of Step 304 serves as the recording request.

In Step 422, the message, provided by the local person is record by the microphone of the camera system. If the message is a video message, the message includes the recording of the video, provided by the camera system.

In Step 424, the recorded message is stored. In one embodiment of the invention, the recorded message is stored by the remote processing service. Alternatively, the recorded message may be stored elsewhere.

In Step 426, the remote person to which the message is to be sent is identified. The remote person to be notified may be specified in the communication action, or alternatively the user, when recording the message, may have specified a recipient. For example, a specific person or a group of persons to be contacted may be named in the communication action, or all people that are associated with the site, e.g., persons that have a profile, may be selected.

In Step 428, the remote person is notified of the available message. The notification may be any kind of push notification, signal or message such as a ringtone, a notification sound, an indicator light, a text message, a voice message, etc., sent to the user's smartphone or any other remote computing device that the user is accessing.

In Step 430, a request is received, from the remote person, to obtain the message. The remote person may provide the request as a spoken request, or by selecting a message retrieval option, e.g., on the remote person's smartphone The execution of Steps 428 and 430 is optional. Accordingly, the method may also directly proceed from Step 426 to Step 432.

In Step 432, the stored message is provided to the remote person. In one embodiment of the invention, the stored message, located on the remote processing service is streamed to the remote person's computing device. The stream may include audio or audio and video content.

FIG. 4C shows a method for delivering a notification to the local person, in accordance with one or more embodiments of the invention. The notification may be a prerecorded message, e.g., a audio message, that another user of the monitoring system may have generated. Alternatively, the notification may be a message, synthesized by the monitoring system, based on instructions provided by a person. In one embodiment of the invention, the message may be configured to be obtained by only a particular person or persons. Accordingly, the message, when generated, may include a message configuration that specifies additional criteria such as a particular target audience and/or a passcode to be provided prior to retrieval of the message. The passcode may be a phrase, a password, a key, a particular gesture, or any other feature or action that may be used to restrict access to the message. The message, along with the additional criteria, if used, may be stored on the remote processing service, or elsewhere, until it is retrieved.

In Step 440, a notification is provided to the local person, signaling that a message is available. For example, the visual indicator of the camera system may indicate, e.g., via a flashing light, that a message is available for retrieval. Alternatively or in addition, an audio message or a signaling tone may be used.

In Step 442, a determination is made about whether the local person has requested the playback of the available message. The request may be a verbal request by the local person, a gesture, or any other indication that the monitoring system may detect as a request to play back the message. If no request is detected, the method may remain in Step 442. If a request is detected the method may proceed to Step 444.

In Step 444, a determination is made about whether the local person is authorized to receive the message. The authorization verification may be performed by validating that additional criteria, specified for the message, are met. If an additionally provided criterion requires the recipient of the message (i.e., the local person) to be a specific person, the identity of the person obtained in Steps 306 and 308 may be relied upon to determine whether the local person is an acceptable recipient. If an additionally provided criterion requires the local person to provide a passcode, the local person may be asked to provide the passcode, prior to continuing with the execution of the method.

In one embodiment of the invention, Steps 440, 442 and/or 444 is/are skipped, and the method directly proceeds to Step 446.

In Step 446, the recorded message is played back to the user, e.g., via the speaker of the camera system. The recorded message, located for example on the remote processing service, may streamed to the camera system where it may be played back via the speaker of the camera system.

The use case scenarios described below are intended to provide examples of communications performed via a vision-based monitoring system. The methods, in accordance with one or more embodiments of the invention, are however not limited to these use cases. The use case scenarios described below are based on a household that is equipped with camera systems to monitor various rooms. The monitoring system further supports remote computing devices. Assume that the monitoring system has been set up at the front door of a home, and that it is configured to recognize there persons described below.

(i) Notification of Remote Person, Followed by Two-Way Communication:

Consider a scenario in which a homeowner regularly rents out his house to short-term guests. A camera system is installed in the area of the front door, and the monitoring system is configured to recognize registered guests. In the described scenario, the monitoring system performs a facial recognition to identify visitors. The facial recognition is performed based on profile pictures of the guests that may have been obtained from social media profiles, e.g., at the time when the guests made a reservation for the short-term rental. When the guests enter through the front door, the monitoring system identifies the guests, and performs the following preprogrammed communication actions. First, the monitoring system verifies, based on the facial recognition, the number of people entering, and their identities. The monitoring system thus ensures that no people that have not been previously registered are among the guests. Next, the homeowner is notified with a summary of the monitoring system's findings. The notification may be provided to the homeowner's smartphone as a text message. The notification may also include an image or a video clip taken as the guests are entering, to enable the homeowner to personally verify the identity of the people entering his house. In the above scenario, an unknown person is among the group of visitors, and the homeowner therefore decides to initiate a two-way communication to ask for clarification, as described in FIG. 4A. A two-way communication channel is established between the camera system and the homeowner's smartphone. The communication channel includes audio and video for the homeowner, provided by the camera system, whereas only an audio channel is provided to the group of guests, via the speaker of the camera system.

(ii) One-Way Communication from Local Person to Remote Person:

Consider a scenario in which the housekeeper is cleaning the house while the homeowner is at work. While the housekeeper is on-site, the mailman stops by to deliver a package that requires a signature by the homeowner. The housekeeper uses the monitoring system to notify the homeowner of the failed deliver attempt as follows. First, the housekeeper waives at the camera system of the monitoring system. The camera system recognizes the housekeeper, obtains her profile, and further recognizes, based on a communication action defined in her profile, that her waiving is a request for recording a message to be sent to the homeowner. As described in FIG. 4B, the monitoring system, via the camera system, records the housekeeper's message in which she indicates that a package could not be delivered due to the signature requirement. In this scenario, the message includes an audio and a video recording, although an audio recording alone would have been sufficient. The recorded message is stored on the remote processing service of the monitoring system, and a text message notification is provided to the homeowner's smartphone. The homeowner opens a smartphone application that interfaces with the monitoring system and subsequently, the message, provided by the remote processing service, is played back on the homeowner's smartphone.

(iii) Message Provided by Remote Person, Delivered to Local Person:

Consider a scenario in which the remote person wants to notify his wife, Cindy, of his dinner plans. He therefore, using his cell phone, provides the following instruction to the monitoring system: "When Cindy gets home, tell her: "Cindy, please get ready for dinner. I made a reservation for 7 PM." When Cindy returns home at 5 PM, the monitoring system detects her presence as she enters through the front door and immediately plays back the message "Cindy, please get ready for dinner. I made a reservation for 7 PM." Alternatively the remote user submitted the request to the monitoring system:" When Cindy gets home, tell her to get ready for dinner. I made a reservation for 7 PM." In this case, the monitoring system uses natural language processing (NLP) methods to analyze the request, and based on the request, prepare a message for Cindy. The message prepared for Cindy, synthesized by the monitoring system, is: "Cindy, your husband asks you to get ready for dinner. He has made a reservation for 7 PM." Next, the monitoring system plays back the message for Cindy, as described in FIG. 4C when she is detected by the monitoring system, entering through the front door.

(iv) Notification of all Users of the Monitoring System Upon Detection of a Communication Gesture:

Consider a scenario in which the monitoring system is configured to provide a notification (e.g., a text message, an email, a video and/or audio clip, etc.) to all remote computing devices (e.g., smart phones) that are registered with the monitoring system, based on profiles being set up for the users of the remote computing devices. When Tom returns home from school, he waves at the camera. The waving is recognized by the monitoring system as a communication request, and a notification is thus sent to all registered remote computing devices indicating, for example: "Tom waved hello."

(v) Selective Notification of One or More Particular Users of the Monitoring System Upon Detection of a Communication Gesture:

Consider that, in the above scenario, the monitoring system is further configured to listen to and understand the communication request. When Tom returns home from school, he wants to let his mother know that he aced the most recent math test. He waves at the camera and says "I want to talk to mom". The monitoring system determining, using, NLP, that Tom wants to speak with his mother. Using this information, the monitoring system searches profiles associated with the site (i.e., the location at which Tom is located) to determine if any profile specifies a relationship of mother with respect to Tom. If such a profile is identified, the monitoring system send a notification to Tom's mother. Tom's mother receives a message such as: "Tom wants to talk to you." Tom's mother then responds, which activates a two-way communication channel between the camera system facing Tom and Tom's mother's smart phone, allowing Tom to tell his story.

Figure 5:
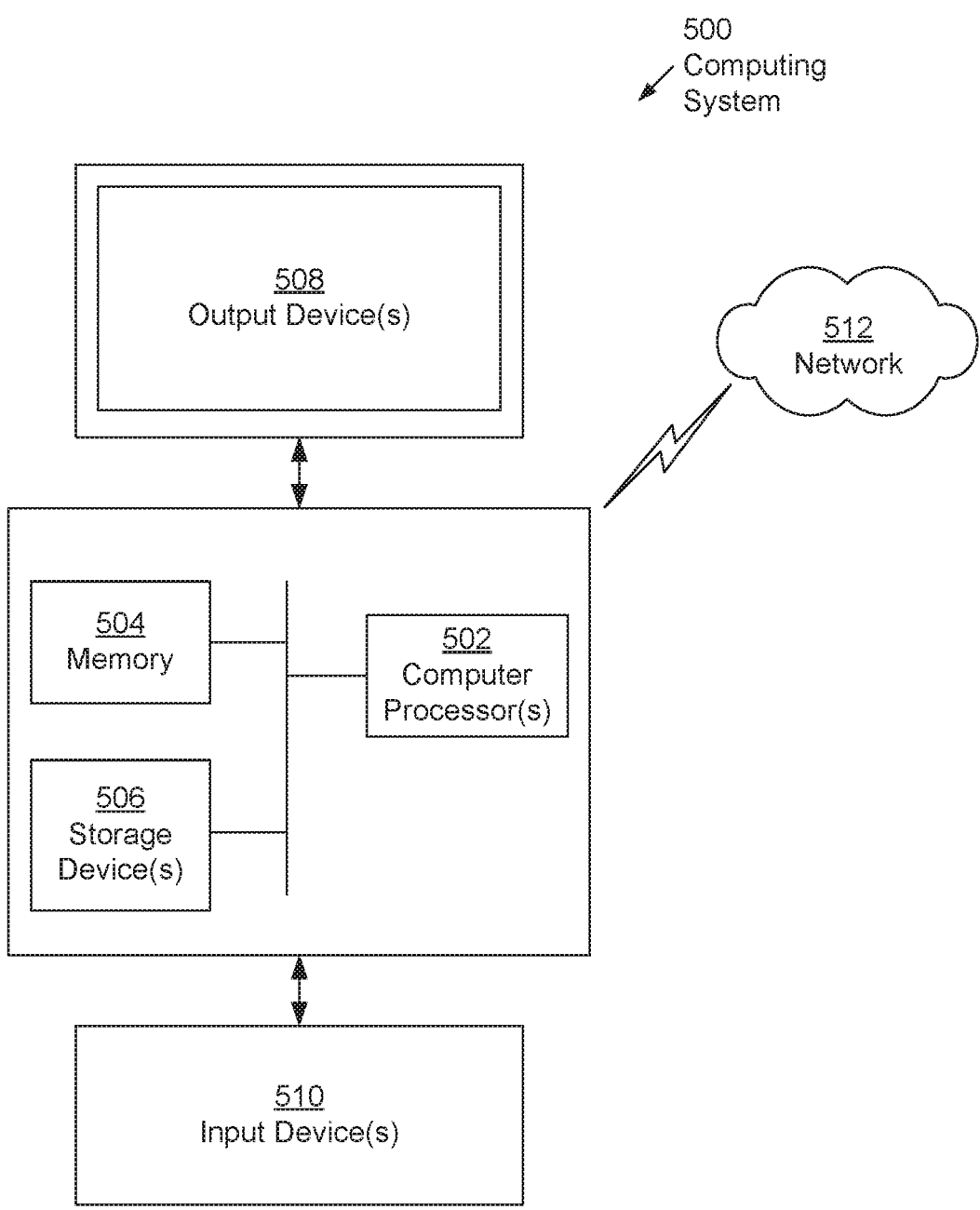
FIG. 5 shows a computing system, in accordance with one or more embodiments of the invention.

Embodiments of the technology may be implemented on a computing system. Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (500) may be located at a remote location and connected to the other elements over a network (512). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for enabling communicating between users, the method comprising:

storing, by a monitoring device, a plurality of action definitions corresponding to visual gestures;

monitoring, by a camera of the monitoring device, an environment for events;

determining, by the monitoring device, that a detected event of the events involves a local person in the monitored environment;

identifying, by the monitoring device, a profile associated with the local person;

identifying, by the monitoring device, a communication action associated with the profile;

detecting, by the monitoring device, a visual gesture performed by the local person, wherein the visual gesture is captured by the camera;

determining, by the monitoring device, that the detected visual gesture corresponds to at least one action definition of the stored plurality of action definitions;

determining, by the monitoring device, whether the at least one stored action definition corresponds to the communication action;

in accordance with a determination that the communication action corresponds to the at least one stored action definition, recording, by the camera of the monitoring device and based at least in part on the detected visual gesture, a message corresponding to the local person;

storing, by the monitoring device, the recorded message;

based at least in part on the determination, identifying, by the monitoring device, at least one remote person to be contacted;

identifying, by the monitoring device, a communication channel to the at least one remote person; and providing, by the monitoring device, the stored message to the at least one remote person via the identified communication channel.

2. The method of claim 1, further comprising:
identifying the local person, and wherein the provided message comprises an identity of the local person.

3. The method of claim 1, wherein the at least one remote person to be contacted comprises a person with a profile associated with a site.

4. The method of claim 1, wherein the visual gesture is recognized as an indication of the local person's intention to communicate.

5. The method of claim 1, wherein the at least one remote person to be contacted is a person specified by the local person, in a communication request, received by the monitoring device and from the local person.

6. The method of claim 5, wherein the at least one remote person to be contacted is a person specified by a name or a relationship, in the communication request, received by the monitoring device and from the local person.

7. The method of claim 1, further comprising, after providing the message to the at least one remote person:
receiving a request, from one of the at least one remote person, to communicate with the local person; and
establishing a communication connection between the local person and the remote person.

8. The method of claim 7, wherein the communication connection between the local person and the remote person comprises a two-way audio communication channel.

9. The method of claim 8, wherein the communication connection between the local person and the remote person further comprises a one-way video channel from the local user to the remote user.

10. A monitoring device, comprising:
a memory for storing computer-readable instructions
a camera; and one or more processors for executing the computer-readable instructions to at least:
store a plurality of action definitions corresponding to visual gestures;
monitor, via the camera, an environment for events;
determine that a detected event of the events involves a local person in the monitored environment;
identify a profile associated with the local person;
identify a communication action associated with the profile;
detecting a visual gesture performed by the local person, wherein the visual gesture is captured by the camera;
determine that the detected visual gesture corresponds to at least one action definition of the stored plurality of action definitions;
determine whether the at least one stored action definition corresponds to the communication action;
in accordance with a determination that the communication action corresponds to the at least one stored action definition, record, via the camera of the monitoring device and based at least in part on the detected visual gesture, a message corresponding to the local person;
store the recorded message;
identify a remote person to which the stored message is to be sent; and
provide the stored message to the remote person.

11. The monitoring device of claim 10, further comprising, prior to providing the stored message to the remote person:
notifying the identified remote person of the availability of the stored message; and
receiving a request, from the remote person, to obtain the stored message.

12. The monitoring device of claim 10, further comprising identifying the local person, by querying profiles of persons specific to the site where the local person was detected, in a monitoring system database.

13. The monitoring device of claim 12 wherein identifying the remote person to which the message is to be sent comprises at least one of obtaining the identity of the remote person from the local person or obtaining the identity of the remote person from the profile of the local person.

14. A non-transitory computer readable medium comprising instructions that enable a monitoring device to perform operations comprising:
storing, by a monitoring device, a plurality of action definitions corresponding to visual gestures;
monitoring, by a camera of the monitoring device, an environment for events;
determining that a detected event of the events involves a local person in the monitored environment;
identifying, by the monitoring device, a profile associated with the local person;
identifying, by the monitoring device, a communication action associated with the profile;
detecting a visual gesture performed by the local person, wherein the visual gesture is captured by the camera;
determining, by the monitoring device, that the detected visual gesture corresponds to at least one action definition of the stored plurality of action definitions;
determining, by the monitoring device, whether the at least one stored action definition corresponds to the communication action;
in accordance with a determination that the communication action corresponds to the at least one stored action definition, recording, by the camera of the monitoring device and based at least in part on the detected visual gesture, a message corresponding to the local person;
storing the recorded message;
identifying a remote person to be contacted; and
providing the recorded message to the remote person.

15. The non-transitory computer readable medium of claim 14, wherein the visual gesture is recognized as an indication of the local person's intention to communicate.

16. The non-transitory computer readable medium of claim 14, wherein the at least one remote person to be contacted is a person specified by the local person, in a communication request, received by the monitoring device and from the local person.

17. The non-transitory computer readable medium of claim 16, wherein the at least one remote person to be contacted is a person specified by a name, in the communication request, received by the monitoring device and from the local person.

18. The non-transitory computer readable medium of claim 16, wherein the at least one remote person to be contacted is a person specified by a relationship, in a communication request, received by the monitoring device and from the local person.

* * * * *